United States Patent [19]

Payet et al.

[11] Patent Number: 4,534,819

[45] Date of Patent: Aug. 13, 1985

[54] WOVEN TEXTILE FABRIC HAVING AN ULTRASONICALLY CUT AND SEALED EDGE AND APPARATUS AND PROCESS FOR PRODUCING SAME

[75] Inventors: George L. Payet, Fort Mill; Stephen C. Ballard, Lancaster, both of S.C.

[73] Assignee: Springs Industries, Inc., Fort Mill, S.C.

[21] Appl. No.: 555,664

[22] Filed: Nov. 28, 1983

[51] Int. Cl.³ .................. B29C 27/08; B32B 31/18
[52] U.S. Cl. .................. 156/515; 156/73.3; 156/88; 156/267; 156/580.2; 425/174.2
[58] Field of Search .......... 156/73.1, 73.3, 88, 156/251, 267, 515, 580.1, 580.2; 264/23; 425/174.2

[56] References Cited

U.S. PATENT DOCUMENTS

| | | | |
|---|---|---|---|
| 2,633,894 | 4/1953 | Carwile | 156/73.5 |
| 2,987,107 | 6/1961 | Sylvester et al. | 156/515 |
| 3,222,239 | 12/1965 | Deans | 156/580.1 |
| 3,378,429 | 4/1968 | Obeda | 156/515 |
| 3,419,447 | 12/1968 | Hewitt | 156/73.3 |
| 3,439,392 | 4/1969 | McNab, Jr. | 156/73.2 |
| 3,445,307 | 5/1969 | Balamuth et al. | 156/73.4 |
| 3,459,610 | 8/1969 | Dijkers et al. | 156/73.1 |
| 3,737,361 | 6/1973 | Obeda | 156/580.1 |
| 4,069,727 | 1/1978 | Sparks et al. | 156/88 |
| 4,097,327 | 6/1978 | Calemard | 156/515 |
| 4,313,778 | 2/1982 | Mims | 156/580.1 |
| 4,410,383 | 10/1983 | Lipari | 156/73.1 |
| 4,496,407 | 1/1985 | Lowery, Sr. et al. | 156/73.3 |

*Primary Examiner*—Michael Wityshyn
*Attorney, Agent, or Firm*—Bell, Seltzer, Park and Gibson

[57] ABSTRACT

A woven textile fabric having at least 65% thermoplastic fibers therein with an ultrasonically cut and sealed edge characterized by a wash durability of preferably at least 25 to 50 washings without significant raveling. Apparatus and processes are provided for effecting such ultrasonic cutting and sealing to produce the desired cut and sealed edge in the woven textile fabric.

20 Claims, 8 Drawing Figures

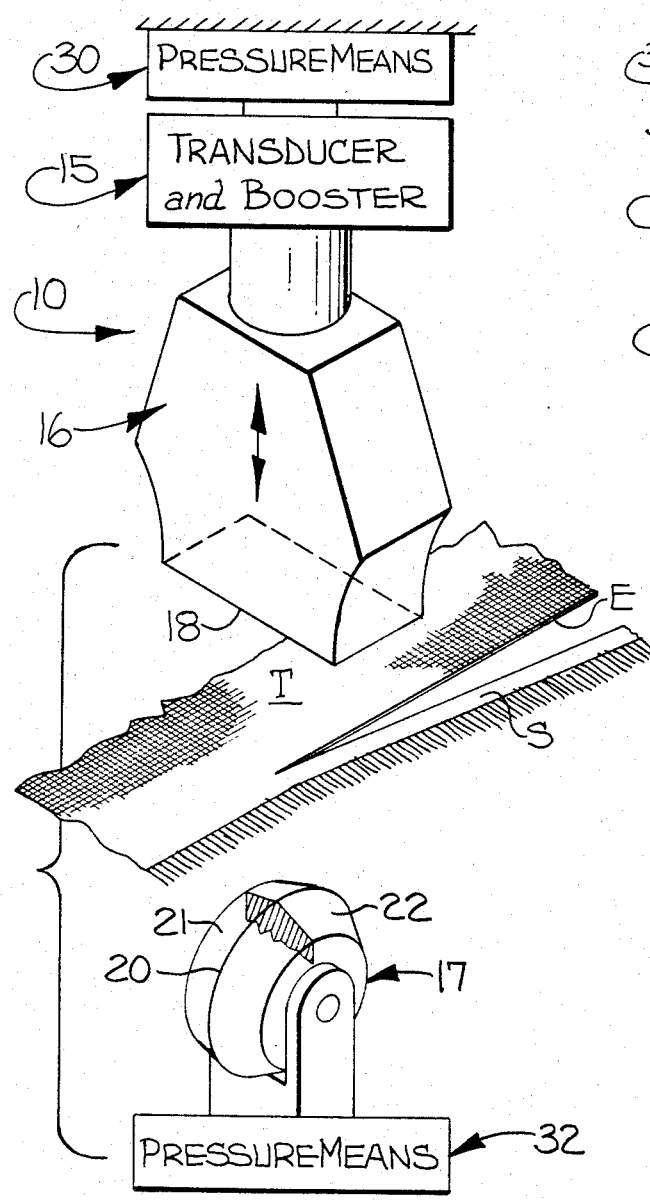
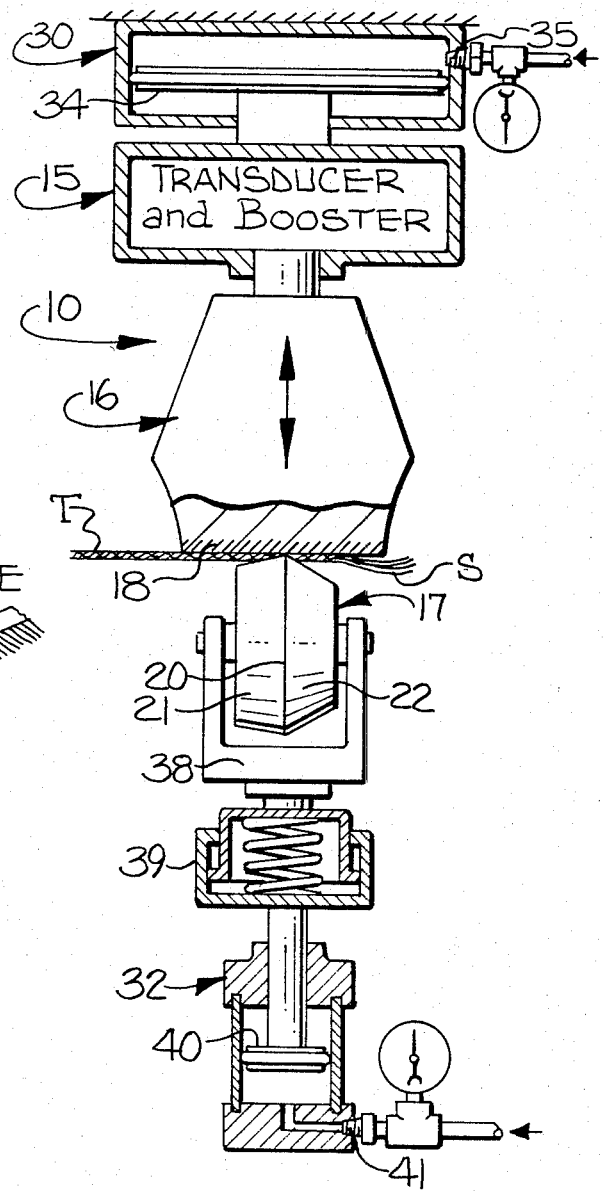
Fig-4
Fig-5
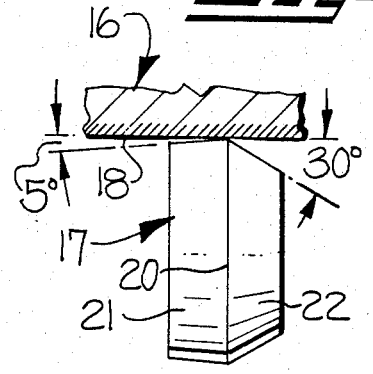
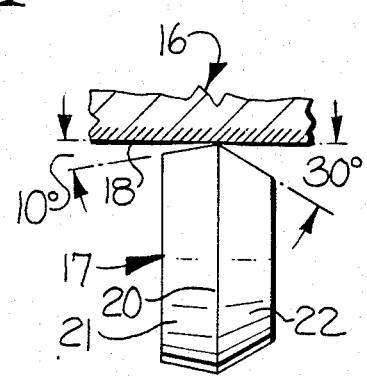
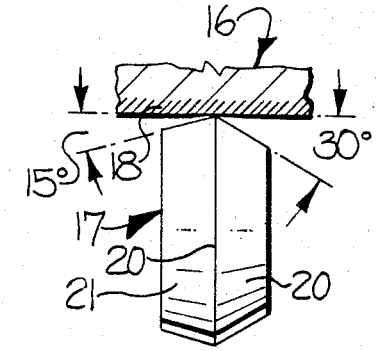
Fig-6
Fig-7
Fig-8

WOVEN TEXTILE FABRIC HAVING AN ULTRASONICALLY CUT AND SEALED EDGE AND APPARATUS AND PROCESS FOR PRODUCING SAME

FIELD OF THE INVENTION

This invention relates to a woven textile fabric having a cut and sealed edge, preferably ultrasonically produced, characterized by a wash durability of preferably at least 25 to 50 washings without significant raveling of the ultrasonically cut and sealed edge. This invention further relates to an apparatus and process for effecting ultrasonically such cutting and sealing to produce the desired cut and sealed edge.

BACKGROUND OF THE INVENTION

In preparing woven textile fabrics for marketing in the form of fabricated products, such as bed sheets or the like, or piece goods, such as garment fabrics, the selvage edges along the longitudinal side edge portions of the textile fabric and parallel with the warp yarns in the fabric must have an aesthetically pleasing appearance, while being durable to an accepted number of washings, i.e. up to about 50 washings for bed sheets and up to about 25 washings for apparel fabrics, without raveling of the yarns at the selvage edges. Also, if continuous lengths of the textile fabric are cut transversely and parallel with the filling yarns, the transverse cut edges must have the same characteristics.

Heretofore, with the use of normal shuttle-type looms, selvage edges of the acceptable type discussed above could be easily woven directly into the textile fabric as it is woven on the shuttle-type looms. However, with the recent advent of high speed looms, particularly air jet looms, a fringed selvage is produced on one or both longitudinal side edge portions of the fabric by the loom which is undesirable from the standpoint of aesthetics in the marketable end products and often in finishing of the fabric after it is woven on the looms. While for some end products it is acceptable to some manufacturers to simply trim the fringe along the selvage edges, this procedure is not acceptable to others particularly when producing bed sheets and garment fabrics. Accordingly, such undesirable selvage must be cut off in predetermined widths and the cut side edges must be sealed to prevent raveling of the yarns at the cut edges. Also, when transverse cuts are made through the textile fabric, the cut edges must be sealed to prevent raveling of the yarns at such cut edges. This sealing has conventionally been performed by hemming of such cut edges with a sewing machine. However, such cutting and hemming operations, particularly along the entire longitudinal edges of the textile fabric, are by necessity time consuming and, thus, slow down further processing of the textile fabric following weaving on the looms.

With this problem in mind, applicants investigated a number of alternate apparatuses and processes which might be used for cutting woven textile fabric and particularly for cutting off predetermined widths of the undesirable selvages and sealing the cut edges to produce an aesthetically pleasing cut and sealed edge which had a preferable wash durability of at least 25 to 50 washings without significant raveling of the yarns at the cut and sealed edges.

The apparatuses and processes investigated for accomplishing the above included laser operations, hot wheel cutting and sealing, mechanical cutting and adhesive application, and ultrasonics. As a result of these investigations by applicants, lasers, hot wheel cutting and sealing, and mechanical cutting and adhesive application were determined to be unacceptable processes and apparatuses for accomplishing these purposes. The laser operation, while it produced a sharp cut edge, provided blackened edges and little, if any sealing which resulted in no durability to washing of the cut edges. Hot wheel cutting and sealing produced severe puckering and no durability to washings. The use of mechanical cutting and adhesive sealing produced generally stiff edges and resulted in other problems. Preliminary investigations by applicants with ultrasonic equipment and apparatus indicated that desired cutting and sealing probably could be performed which probably would provide an aesthetically acceptable cut and sealed edge and would likely produce the desired wash durability against raveling in the cut and sealed edge.

At the time of applicants' invention, ultrasonic slitting and sealing equipment was available from several manufacturers including Branson Sonic Power Company, Sonobond Ultrasonics and Cavitron Ultrasonics in the United States and F. Calemard and Cie of France. Commercial brochures of the ultrasonic slitting and sealing equipment of these companies indicated that this equipment was designed primarily for use with all plastic or thermoplastic materials including primarily nonwoven extruded sheet materials or 100% thermoplastic fiber woven material. However, these brochures did indicate that the equipment could be utilized to cut and seal woven textile fabric having blended yarns therein in which all of the fibers of the yarns were not necessarily thermoplastic, but only a substantial portion thereof were thermoplastic. Notwithstanding, to applicants' knowledge all of the applications or use of ultrasonic slitting and sealing equipment on such woven textile fabrics having blended yarns was for producing end products having a cut and sealed edge which did not require the high degree of wash durability against yarn raveling preferably of from about 25 to 50 washings as did the end products desired by applicants. Accordingly, woven textile fabrics of blended thermoplastic and non-thermoplastic fibers with ultrasonic cut and sealed edges having the characteristics discussed above did not exist to applicants' knowledge prior to the present invention.

OBJECTS AND SUMMARY OF THE INVENTION

Accordingly, the first object of this invention is to produce a woven textile fabric having a cut and sealed edge, preferably ultrasonically produced, characterized by a wash durability of preferably at least 25 to 50 washings without significant raveling of the ultrasonically cut and sealed edge.

To accomplish this object, applicants set out to determine exactly what characteristics and construction features must be present in a woven textile fabric having a cut and sealed edge, preferably ultrasonically produced, which is aesthetically acceptable and which has a wash durability of preferably at least 25 to 50 washings without significant raveling of the ultrasoncially cut and sealed edge.

By this invention, applicants have determined that this object may be accomplished by providing a woven textile fabric comprising a plurality of woven warp and filling yarns respectively extending in generally parallel side-by-side relationship in the longitudinal and transverse directions of the fabric and including at least 65% thermoplastic fibers. The cut and sealed edge is comprised of a fused mass of thermoplastic fibers bonded to each other and to any other fibers in the mass. The mass is of a thickness no greater than the thickness of the fabric and extends in either the longitudinal or transverse direction of the fabric and generally parallel with the respective warp or filling yarns, depending upon whether undesirable selvages are being removed or whether transverse cuts are being made. The fused mass is of a width of from about 0.01 to 0.10 inch and should encompass from 2 to 4 of the respective parallel warp or filling yarns.

Preferably, the textile fabric includes thermoplastic and cotton fibers including about 65 to 80% thermoplastic fibers in the fabric and when removing undesirable selvages at least 65% thermoplastic fibers in the warp yarns. When the cut and sealed edge is formed by removing undesirable fringed selvages, the fused mass of thermoplastic fibers extends in the longitudinal direction of the fabric and generally parallel with the respective warp yarns to encompass from 2 to 4 of the respective warp yarns.

In order to produce the above discussed novel textile fabric having the cut and sealed edges, preferably ultrasonically produced, applicants experimented with the above discussed commercially available ultrasonical cutting and sealing apparatuses and known processes of ultrasonically cutting and sealing woven textile fabric and developed significant improvements to such apparatuses and processes.

Accordingly, the second object of this invention is to provide an apparatus and process for ultrasonically edge cutting and sealing textile fabric having thermoplastic fibers to produce a clean and sharp cut and sealed edge having a desired wash durability without significant raveling.

By this invention, applicants have determined that for attaining the above second object, an improved anvil construction must be provided for use in such ultrasonic edge cutting and sealing apparatus and process.

Accordingly, a third object of this invention is to provide an improved construction of such anvil to be used in a process and apparatus for ultrasonically cutting and edge sealing at least partially thermoplastic material.

By this invention, it has been determined that this second and third object of the invention may be accomplished by providing the following.

Means feed the fabric at a substantially constant predetermined rate of speed through the ultrasonic edge cutting and sealing apparatus including sonic horn means having transducer and booster means and a flat working face on the horn means of hardened metal for vibrating an predetermined frequency. There is further provided an improved anvil means positioned for receiving the moving textile fabric between the vibrating horn face and the anvil means and for contact by the horn face during its vibrations to edge cut and seal the cut edge of the moving fabric.

The improved anvil means comprises a wheel having a beveled periphery defining therearound a peaked cutting edge and first and second surfaces extending in respective opposite directions from the peaked cutting edge. The first surface extends inwardly of the cut edge being formed on the moving textile fabric and forms a predetermined included angle with the horn face from the cutting edge of the anvil, preferably from about 3 to 20 degrees, for fusing the thermoplastic fibers and sealing the cut edge of the fabric a predetermined distance inwardly of the cut edge which is determined by and increases with the increasing acuteness of the predetermined included angle. The second surface extends outwardly of the cut edge being formed on the moving textile fabric and is provided for reinforcing the anvil cutting edge to resist wear and forms a predetermined included acute angle with the horn face from the cutting edge of the anvil which is greater than the included angle of the first sealing surface, preferably at least 2½ degrees greater and no more than 45 degrees, so that the first and second surfaces will form a sharpness for the peaked anvil cutting edge which will effect a clean and sharp cutting of the moving fabric.

There is further provided means for mounting the sonic horn means under a predetermined pressure and means mounting the anvil means under a predetermined pressure and for movement away from the horn means a predetermined distance upon contact of the anvil means by the horn means during its vibrations, so that predetermined forces are exerted by the horn means and the anvil means on the moving fabric upon contact between the horn means and the anvil means and the anvil means will float as it is contacted by the horn means for aiding and providing the desired cutting and sealing action on the textile fabric.

With this improved apparatus and process, a clean and sharp cut edge will be provided through the textile fabric and such cut edge will be sealed by fusing and bonding a mass of the thermoplastic fibers in the fabric adjacent to and extending inwardly of the fabric from the cut edge from about 0.01 to 0.10 inch and encompassing from about 2 to 4 of either the warp or the filling yarns which extend parallel to the cut edge by vibrations of the sonic horn means toward the first surface of the anvil means to provide a wash durability of from about 15 to 132 and preferably 25 to 50 washings without significant raveling in the textile fabric.

BRIEF DESCRIPTION OF THE DRAWINGS

Some of the objects and advantages of this invention have been set forth above, other objects and advantages of the invention will become apparent in the detail description to follow when taken in conjunction with the accompanying drawings, in which:

FIG. 4 is a schematic perspective view of the ultrasonic cutting and sealing equipment according to this invention as it is cutting and sealing woven textile fabric;

FIG. 5 is a partial, schematic, elevational, cross-sectional view through the ultrasonic cutting and sealing apparatus as it is cutting and sealing woven textile fabric; and FIGS. 6–8 are schematic views illustrating various acceptable angles for the surfaces of the improved anvil according to this invention which is utilized in the ultrasonic cutting and sealing apparatus and process.

DETAILED DESCRIPTION OF PREFERRED EMBODIMENTS OF THE INVENTION

Figure 1:
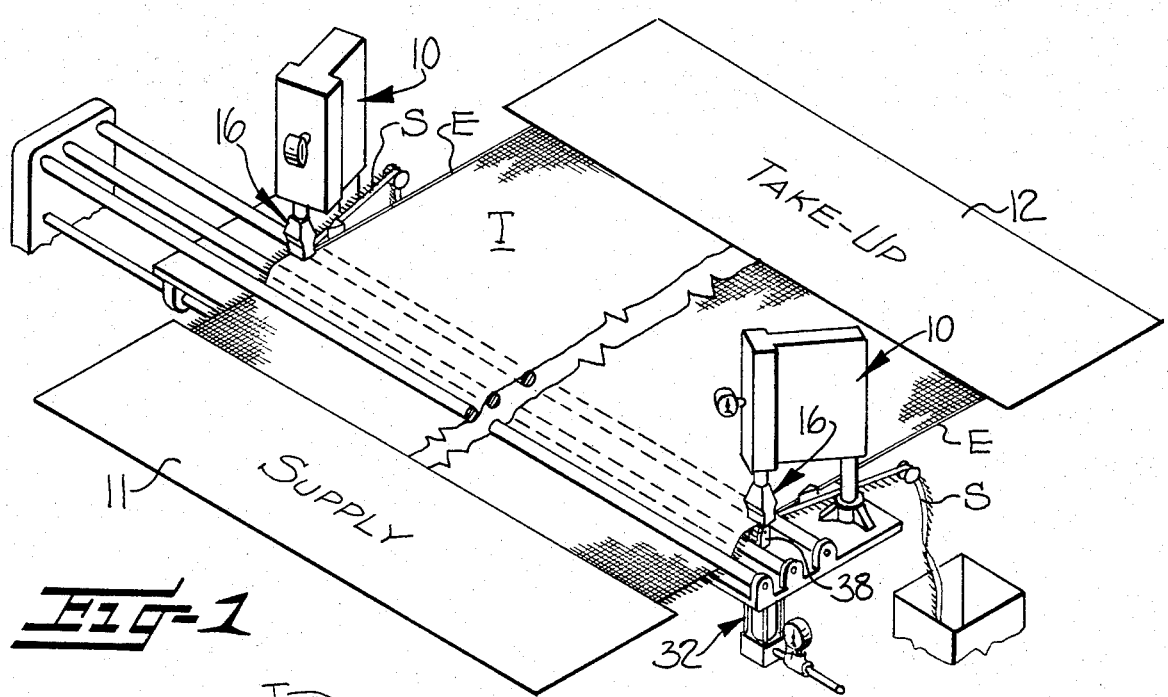
FIG. 1 is a somewhat schematic, perspective view of apparatus constructed in accordance with this invention.

Referring now to the drawings, the figures thereof illustrate an apparatus, generally indicated at 10, and process for cutting off undesirable fringed selvage S from woven textile fabric T along longitudinal side edge portions of continuous lengths of such textile fabric T, and the resulting textile fabric T having ultrasonically cut and sealed edges E parallel with the warp yarns W of the textile fabric T. However, it is to be understood that this ultrasonic cutting and sealing apparatus 10 and process could also be utilized to transversely cut a continuous length of textile fabric T into individual pieces which would produce a cut and sealed edge E transversely across the woven textile fabric T and parallel with the filling yarns F.

Considering now the novel woven textile fabric T having a cut and sealed edge E, preferably ultrasonically produced, this cut and sealed edge E is characterized by a wash durability of at least 25 to 50 washings without significant raveling of the yarns W, F at the cut and sealed edge E. The woven textile fabric T comprises a plurality of such woven warp yarns W and filling yarns F respectively extending in generally side-by-side relationship in the longitudinal and transverse directions of the textile fabric T.

Although it was determined that cutting and sealing to some extent can be obtained with woven textile fabrics having a lesser percentage of thermoplastic fibers, it has been further determined that, in order to obtain the desired sealing and aesthetic qualities in the ultrasonically cut and sealed edge E, the textile fabric T should contain at least 65% thermoplastic fibers, preferably about 65 to 80% thermoplastic fibers in the yarns W, F of the textile fabric T, and at least 65% theremoplastic fibers in the warp yarns W if the ultrasonic cut and sealed edge is to extend parallel to such warp yarns W such as would be the case when removing undesirable fringed selvage S. The above percentage of thermoplastic fibers in the textile fabric T could include conventional 65/35% polyester/cotton yarns for both the warp and filling yarns W, F which would constitute a 65/35% polyester/cotton fabric, or an 80/20% polyester/cotton fabric which could utilize warp yarns having 65/35% polyester/cotton fibers and 100% polyester fiber filling yarns, or an 80/20% polyester/cotton fabric utlizing 100% polyester fiber warp yarns and 65/35% polyester/cotton filling yarns. Various other alternative blends of types of thermoplastic and nonthermoplastic fibers are, of course, possible.

Figure 2:
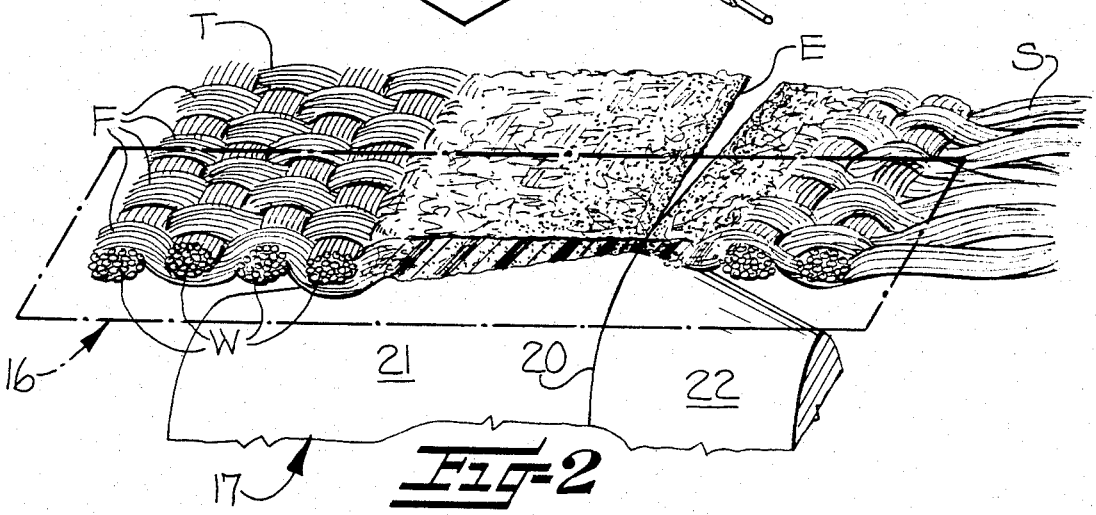
FIG. 2 is a partial, somewhat schematic, perspective view of the improved anvil construction in accordance with this invention to be used in ultrasonic cutting and sealing apparatus and of the woven textile fabric which has been ultrasonically cut and edge sealed in accordance with this invention.

The cut and sealed edge E comprises a fused mass of the thermoplastic fibers bonded to each other and to any other fibers in the mass, as is schematically illustrated in FIG. 2. This mass of thermoplastic fibers is of a thickness no greater than the thickness of the fabric T, as also shown in FIG. 2, and extends in either the longitudinal or transverse direction of the fabric T and generally parallel with the respective warp or filling yarns W, F. When removing undesirable fringed selvage S, the fused mass of thermoplastic fibers constituting the cut and sealed edge E will extend parallel with the warp yarns W, as illustrated in FIG. 2. The fused mass of thermoplastic fibers constituting the ultrasonically cut and sealed edge E is of a width from about 0.01 to 0.10 inch, preferably from about 0.02 to 0.06 inch, and encompasses from about 2 to 4 of the respective parallel warp or filling yarns W, F. Again, if undesirable fringed selvage S is being removed from the textile fabric T, the fused mass of thermoplastic fibers forming the cut and sealed E will encompass from 2 to 4 of the parallel warp yarns extending inwardly from the cut through the textile fabric T.

The experiments resulting in the present invention have indicated that the weight of the textile fabric T is one of the functions of obtaining a desirable cut and sealed edge E having the desired wash durability of from about 25 to 50 washings. Lightweight textile fabrics T in general seal very well with the use of ultrasonic apparatus 10 and processes to be described hereinafter; however, the textile fabrics T must have sufficient weight so that the thermoplastic fibers, when melted by the action of the ultrasonic apparatus (to be discussed below), will sufficiently fuse with other fibers in the fused mass constituting the cut and sealed edge E to provide sealing against raveling of the yarns W, F and produce the desired wash durability. On the other hand, the fabric cannot be too heavy or there will be so much melted thermoplastic material created that it will ooze out of the cut and sealed edge E and stick to the cut edge of the fabric T to form what is known as "flashing" which resembles flashing found around a freshly injection-molded product.

By this invention, experimentation showing that a desirable cut and sealed edge E can be produced on a textile fabric T has been conducted on textile fabric T having a weight of from about 2.25 to 6.00 oz./yd$^2$. This weight fabric has been constructed from yarns having a yarn count in the warp W of from about 60 to 108 and in the filling F of from about 52 to 64, and yarn sizes in the warp W of from about 50/1 to 22/1 and in the filling F of from about 35/1 to 15/1. However, it is to be understood that other types of textile fabrics may well be acceptably ultrasonically cut and edge sealed to produce the novel textile fabric T with cut and sealed edge E having the desirable characteristics discussed above and this invention is not necessarily limited to the particular type of textile fabric T discussed above.

Considering now the ultrasonic apparatus 10 and process utilized to produce the above described novel textile fabric T with a cut and sealed edge E of the desired characteristics discussed above, there is shown in FIG. 1 such ultrasonic apparatus 10 positioned along each of the longitudinal edges of moving textile fabric T for removing undesirable fringed selvage S and forming ultrasonically cut and sealed edges E along each side of the textile fabric T and parallel with the warp yarns W. This apparatus 10 may include features for ultrasonically cutting off predetermined widths of selvages from each side of the textile fabric T regardless of transverse variations in the path of travel or variations in the width of the textile fabric T and sealing the cut edges of the textile fabric T, as disclosed in copending application Ser. No. 555,451, filed concurrently herewith, and assigned to the assignee of the present application. Also, it is to be understood that, although not illustrated, the apparatus 10 could be utilized for transversely cutting the textile fabric T parellel to the filling yarns F to cut the textile fabric T into individual pieces and, in such an arrangement, the apparatus 10 would either be moved transversely across the textile fabric T or the textile fabric T moved transversely through the apparatus 10, as desired.

The apparatuses 10, as illustrated in FIG. 1, may be mounted either directly on a textile loom for removing undesirable selvage S as the textile fabric is fed from the weaving apparatus to the take-up mechanisms of such loom or may constitute a part of an entirely separate machine for off-the-loom removal of undesirable selvage S, as more fully illustrated and described in the aforementioned copending application. Accordingly, in FIG. 2, there is simply illustrated in schematic block form a supply means 11 and a take-up means 12 which may constitute parts of a textile loom or may constitute parts of a separate off-the-loom machine. This supply 11 and take-up 12 include, either together or separately, means for feeding the fabric T through the ultrasonic cutting and sealing apparatus 10 at a substantially constant predetermined rate of speed. Such feeding means may take any form desired according to whether such feeding means forms a part of a textile loom or a separate off-the-loom machine and further illustration and description is not believed necessary herein.

The ultrasonic cutting and sealing apparatus 10 includes conventional devices which are well understood by those with ordinary skill in the art including transducer and booster means, schematically illustrated and indicated at 15. The transducer means receives electrical energy from a power supply (not shown) and converts such electrical energy to mechanical vibrations. The booster means, depending upon its construction, has the capability of boosting the vibrational energy up to a ratio of about 1 to 2.5. The conventional devices of such ultrasonic cutting and sealing means 10 also include a sonic horn means 16 attached to the transducer and booster means 15 for vibrating up and down against an anvil means 17 as a result of the vibrational energy produced by the transducer and booster means 15. The textile fabric T is passed between the sonic horn means 16 and the anvil means 17 for producing the ultrasonic cutting and sealing operation. Most sonic horns 16 are made of titanium, a light-weight metal that wears quickly as the horn vibrates against the anvil. Sonic horns 16 are commercially available with a hardened horn face 18 and applicants have found that such hardened horn face is extremely advantageous and greatly retards wear and the formation of a groove by the anvil 17 in the face 18 of the sonic horn 16. The hardened horn face 18 may be constructed of titanium carbide or other carbide materials. Further details of construction and operation of the above described conventional devices of an ultrasonic apparatus is well known to those with ordinary skill in the art and further details are not believed necessary herein.

In accordance with the present invention, the anvil means 17 is of an improved construction determined by applicants in accordance with the present invention for effecting a clean and sharp cutting of the textile fabric T and desired amounts of edge sealing, while resisting wear on the anvil 17.

In that regard, applicants have determined that the anvil 17 should comprise a wheel having an outside, beveled periphery defining therearound a peaked cutting edge 20 for cutting the moving textile fabric T as the sonic horn 16 and face 18 thereof vibrates against such cutting edge 20. The beveled periphery of the wheel-shaped anvil 17 further defines first and second surfaces 21, 22 extending in respective opposite directions from the peaked cutting edge 20.

The first surface 21 extends inwardly of the cut edge being formed on the moving textile fabric T and forms a predetermined included acute angle with the horn face 18 from the cutting edge 20, as shown particularly in FIGS. 3 and 6–8, for fusing the thermoplastic fibers in the textile fabric T and sealing the cut edge E of the textile fabric T a predetermined distance inwardly of the cut edge as the face 18 of the sonic horn 16 vibrates against the first surface 21 of the anvil 17 and generates heat in the textile fabric T causing melting of the thermoplastic fibers. The predetermined distance of sealing is determined by and increases with the increasing acuteness of the predetermined angle of the first surface 21 of the anvil 17. Accordingly, the acute angle of the first surface 21 of the anvil 17 with respect to the face 18 of the sonic horn means 16 is extremely critical and determines the amount of sealing obtained in the cut and sealed edge E of the textile fabric T.

Figure 3:
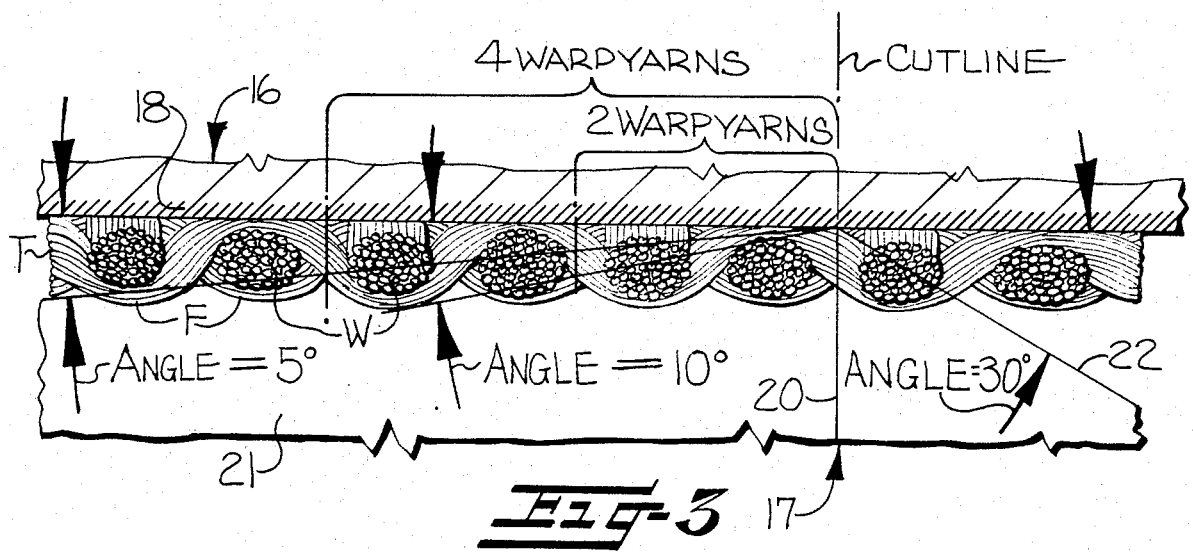
FIG. 3 is a schematic view illustrating the improved anvil construction and the effect thereof in ultrasonic cutting and sealing of woven textile fabric to form a desired cut and sealed edge.

It has been found by applicants that, for the types of textile fabrics experimented with and discussed above, this acute angle of the first surface 21 of the anvil 17 can vary preferably from 5 to 15 degrees; although, extremely thin or lightweight textile fabrics T could require a more acute angle down to 3 degrees and extremely heavy weight textile fabrics T could require sharper acute angles of up to 20 degrees or so. As the acute angle of this first surface 21 of the anvil 17 becomes sharper and sharper, the degree of sealing becomes less and less on the same textile fabric T. For example, a 5 degree angle for the first surface 21 of the anvil 17, shown in FIG. 6, used for cutting and sealing a "Muslin" type textile fabric T having a polyester to cotton fiber ratio of 65/35% and a weight of about 3.9 oz./yd². produces a cut and sealed edge E that has a fused mass encompassing 4 warp yarns W; whereas, a 10 degree angle, as shown in FIG. 7, used on the same type of textile fabric T produces a sealed edge E having a fused mass encompassing 2 warp yarns. This relationship is schematically illustrated in FIG. 3.

The same angles for the first surface 21 of the anvil 17 may produce different widths of the cut and sealed edge E with different fabric constructions; however, the number of warp yarns W encompassed within the cut and sealed edge E of the textile fabric T will generally be similar and the width of such cut and sealed edge E of the textile fabric T will fall within the above described range of from about 0.01 to 0.10 inch and preferably from about 0.02 to 0.06 inch for obtaining the desired wash durability of at least 25 to 50 washings without significant raveling at the cut and sealed edge E.

The second surface 22 of the anvil 17 extends outwardly of the cut edge being formed on the moving textile fabric T for reinforcing the anvil cutting edge 20 to resist wear on such anvil cutting edge 20 and forms a predetermined included acute angle with the sonic horn face 18 from the cutting edge 20, as shown particularly in FIGS. 3 and 6–8. The included angle of the second reinforcing surface 22 of the anvil 17 is greater than the included angle of the first sealing surface 21 of the anvil 17 so that the first and second surfaces 21, 22 of the anvil 17 will form a desired sharpness for the peaked anvil cutting edge 20 which will effect a clean and sharp cutting of the moving textile fabric T, while allowing the presence of a less sharp acute angle for the first sealing surface 21.

Through experimentation on the textile fabrics T discussed above, it has been found that the included acute angle of the second reinforcing surface 22 of the anvil 17 should be at least 2½ degrees larger than the included angle of the first sealing surface 21 of the anvil 17 and no greater than 45 degrees, and preferably 30 degrees.

By way of background, during applicants' experimentation, it was found that previously used wheel-type anvils, known as "half anvils", having only one surface 21 extending outwardly from a cutting edge 20, known in the trade as "half anvils", presented a serious problem with respect to wear. The razor-like cutting edge of these "half anvils" resulted in significant wear of such cutting edge in a matter of minutes by the action of the sonic horn means vibrating against such anvils. It was further determined that when using anvils having two surfaces 21, 22 extending in opposite directions from the cutting edge to reduce such wear and wherein the second surface 22 of the anvil 17 had the same included acute angle as the first surface 21, sufficient sharpness was not provided to the cutting edge 20 of the anvil 17 to effect a clean and sharp cut of the textile fabric T.

Accordingly, to overcome these problems, applicants discovered for the first time the novel concept that the included acute angles of the surfaces 21, 22 of the anvil 17 should be dissimilar with the included acute angle of the reinforcing surface 22 being greater than that of the sealing surface 21 of the anvil 17, as discussed above. With this relationship, the second surface 22 will reinforce the cutting edge 20 against wear, while providing a sharp cutting edge 20 on the anvil 17 and providing a desired angle for the first surface 21 to effect the desired sealing in the cut and sealed edge E. Applicants believe that the reason this relationship is successful is that during sealing of the cut and sealed edge E of the textile fabric T by vibration of the sonic horn means 16 against the anvil means 17, molten thermoplastic material is formed by the heat generated and there is no place for the excess molten thermoplastic material to go if the included angle of the second surface 22 of the anvil 17 is the same as the first surface 21 of the anvil 17. Therefore, the excess molten thermoplastic material remains attached to the cut and sealed edge E and when cooled produces poor aesthetics to such edge E. When pieces of such cooled excess thermoplastic material, called "flashing", break off, the integrity of the cut and sealed edge E is destroyed and often raveling of the yarns occurs in the textile fabric T.

With the arrangement of angles for the surfaces 21, 22 of the anvil means 17 provided by applicants, the side of the anvil means 17 along the surface 22 is more open due to the larger included angle and the excess molten thermoplastic material is not constricted and leaves the area without disrupting the cut and sealed edge E of the textile fabric T. Additionally, since there is provided a surface 22 extending from the cutting edge 20 of the anvil means 17, as opposed to the above discussed "half anvils", the sharp cutting edge 22 is supported by the portion of the anvil means 17 forming the surface 22 and wear on such cutting edge 20 is dramatically reduced.

In accordance with the present invention, applicants have also determined that the ultrasonic cutting and sealing apparatus 10 should be further improved to include means 30 mounting the sonic horn means 16 under a predetermined pressure and means 32 mounting the anvil means 17 under a predetermined pressure and for permitting movement of the anvil means 17 away from the sonic horn means 16 a predetermined distance upon contact of the anvil means 17 by the sonic horn means 16 during its vibrations. With this arrangement, predetermined forces are exerted by the horn means 16 and the anvil means 17 on the moving textile fabric T upon contact between the horn means 16 and the anvil means 17 and the anvil means 17 will float as it is contacted by the horn means 16 for aiding in providing the desired cutting and sealing action on the textile fabric T.

The means 30 mounting the sonic horn means 16 under a predetermined pressure may comprise an air-operated piston and cylinder 34 suitably mounted in the apparatus 10 and carrying the transducer and booster means 15 and the sonic horn means 16. The air-operated piston and cylinder 34 receives air under a regulated predetermined pressure from any suitable source (not shown) through an inlet 35. By this invention, it has been found that an air pressure between about 18 to 20 psig is required within this piston and cylinder 34.

The means mounting the anvil means 17 under a predetermined pressure and for movement away from the sonic horn means 16 a predetermined distance may include a clevis device 38 for carrying the anvil means 17 for rotation, if desired, to present a fresh cutting edge 20 and fresh surfaces 21, 22 for contact by the face 18 of the sonic horn means 16. The clevis 38 is supported by a compression spring means or device 39 for being compressed upon contact of the face 18 of the sonic horn 16 with the anvil means 17 so that the anvil means may move away from and float with movement of the sonic horn means 16. By this invention, it has been found that the anvil means should be able to move from about 1/16 to ⅛ inch away from the sonic horn means 16 upon contact of the anvil means 17 by the horn means 16. The compression spring device 39 is in turn supported by an air-operated piston and cyliner means 40 which, through the compression spring device 39, exerts the predetermined pressure on the anvil means 39. The piston and cylinder means 40 receives air under a regulated predetermined pressure from a suitable source (not shown) through inlet 41. By this invention, it has been found that the piston and cylinder means 40 should be under a predetermined pressure of from about 20 to 60 psig and preferably from about 40 to 50 psig. With the combined predetermined pressure of the sonic horn mounting means 30 and the anvil mounting means 32, a force of from about 11.5 to 34 pounds and preferably from about 23 to 29 pounds will be exerted by the sonic horn means 16 and the anvil means 17 on the moving textile fabric T upon contact between the horn means 16 and the anvil means 17.

By way of background, all of the ultrasonic cutting and sealing apparatus manufacturers consulted by applicants prior to this invention advised applicants to use the least pressure possible between the anvil means 17 and the face 18 of the sonic horn means 16 in order to reduce wear on the anvil means 17 to a minimum. However, applicants determined that greater pressure between the sonic horn means 16 and the anvil means 17 is necessary to obtain the desired durable sealing in the cut and sealed edge E of the textile fabric T and should generally be far in excess of what the apparatus manufacturers recommended and within the ranges set forth above.

Next, in accordance with this invention, it has been determined that the rate of speed of feeding of the fabric T through this ultrasonic cutting and sealing apparatus 10 is important, otherwise a number of problems can occur in obtaining the desired cut and sealed edge E on the textile fabric T. As discussed above, the supply 11 and takeup 12, either together or separately, include suitable means for feeding the textile fabric T through the ultrasonic cutting and sealing apparatus 10 at a substantially constant predetermined rate of speed. It has been found that variations in a constant rate of speed can cause loss of sealing effect and rough edges in the cut and sealed edge E of the textile fabric T.

It has long been accepted by manufacturers of ultrasonic apparatus that the major criteria of the rate of speed for feeding fabric T through ultrasonic slitting and sealing apparatus 10 was determined by only one factor, i.e. the overall power of the apparatus 10. For example, a 1,000 watt ultrasonic apparatus 10 was thought to be able to cut and seal at a faster rate than a 150 watt apparatus 10. However, applicants have determined that power is not the most critical criteria of fabric speed, but rather frequency of vibration of the sonic horn means 16. In that regard, the moving textile fabric T will receive a predetermined number of poundings or contact by the sonic horn means 16 and anvil means 17 while it passes therebetween. Accordingly, if the textile fabric T passes between the sonic horn means 16 and the anvil means 17 too rapidly, less poundings or contacts are received and, in some cases, too few poundings or contacts will be received to obtain the desired sealing in the cut and sealed edge E of the textile fabric T to provide the above discussed desired wash durability. On the other hand, if the sonic horn means 16 vibrates at a faster frequency or rate, the textile fabric T will receive the same number of poundings or contacts at higher rates of speed of feeding of the fabric T through the ultrasonic apparatus 10. Fabric weight and power in the ultrasonic cutting and sealing apparatus 10 are also criteria to the rate of feed of the fabric T, since heavier fabrics with more volume to cut and seal will require slower speeds and sufficient power must be available in the ultrasonic apparatus 10.

Until recently, the maximum frequency for vibration of sonic horn means 16 in a commercially available ultrasonic cutting and sealing apparatus 10 was 20,000 hertz. With this vibrational frequency, it has been found by applicants that the rate of speed for feeding the fabric T through the ultrasonic apparatus 10 may be about 20 yards per minute. Recently introduced, commercially available, ultrasonic cutting and slitting apparatus 10 has a frequency of vibration rate for the sonic horn means 16 of up to 40,000 hertz. And, although the commercial manufacturers advised applicants that such higher frequency ultrasonic cutting and sealing apparatus 10 would not produce a desired cut and sealed edge E on the types of textile fabrics T being processed by applicants, applicants experimentally have determined that sufficient sealing in the cut and sealed edge T for the desired wash durability should be obtained in these textile fabrics T with rates of feed of the textile fabric T through the ultrasonic apparatus 10 up to 40 yards per minute. It has also been suggested by commercial manufacturers that higher frequency ultrasonic cutting and sealing apparatus may be available with frequencies up to 1,000,000 hertz. Therefore with apparatus having frequencies between about 15,000 to 1,000,000 hertz, rates of feed of the textile fabric T may vary between 10 to 100 yards per minute.

Applicants have also determined that a factor in obtaining uniform, continuous sealing in the cut and sealed edge E of the textile fabric T depends upon how the fabric T is passed through the ultrasonic apparatus 10. The fabric T should move through the contact point between the sonic horn means 16 and the anvil means 17 smoothly and parallel to the bank of yarns running parallel to the cut edge being formed or in the case of removing undesirable fringed selvage S, parallel to the warp yarns W. If the fabric is moved diagonally through this contact point, "flashing" is formed and durability of the seal in the cut and sealed edge E is never as good when flashing is present because, as the "flashing" is broken off during subsequent washings, it breaks the integrity of the sealed edge E and raveling of the yarns will begin.

If ultrasonic apparatuses 10 are utilized for simultaneously removing undesirable fringed selvage S from each longitudinal side of a continuous length of moving textile material T, the above desired transport of the textile material T through such ultrasonic apparatuses 10 must be insured. For that purpose, reference is again made to the above identified copending application assigned to the assignee of the present invention in which an apparatus for accomplishing these purposes is disclosed.

As may be clearly seen from the above summary of the invention and detailed description of preferred embodiments of the invention, applicants have provided a novel woven textile fabric T having an ultrasonically cut and sealed edge E characterized by a wash durability of at least 25 to 50 washings without significant raveling of the ultrasonically cut and sealed edge E. Applicants have also provided significant improvements to apparatus 10 for ultrasonically cutting and sealing woven textile fabrics T and novel processes for effecting such ultrasonic cutting and sealing to produce the desired cut and sealed edge E which through experimentation has been determined to provide a wash durability of between 15 to 132 washings.

In the drawings and specification there has been set forth preferred embodiments of the invention, but it is to be understood that the invention is not limited thereto and may be embodied and practiced in other ways within the scope of the following claims.

What is claimed is:

1. In an ultrasonic apparatus for edge cutting and sealing moving lengths of at least partially thermoplastic material, particularly textile fabric having at least some thermoplastic fibers, and including anvil means and vibrating sonic horn means having a flat working face cooperating with and vibrating against said anvil means for the ultrasonic edge cutting and sealing as the material moves between said sonic horn and said anvil means; the improvement of a construction of said anvil means characterized by effecting clean and sharp edge cutting and desired amounts of edge sealing in the material while resisting wear on said anvil means, said anvil means comprising:

a wheel having a beveled periphery defining therearound a peaked cutting edge for cutting the moving material as said sonic horn vibrates against said cutting edge and first and second surfaces extending in respective opposite directions from said peaked cutting edge;

said first surface forming a predetermined included acute angle with said horn face from said cutting edge for fusing the thermoplastic material and sealing the cut edge of the material a predetermined distance inwardly of the cut edge as said sonic horn vibrates against said anvil means, the predetermined distance of sealing being determined by and increasing with the increasing acuteness of the predetermined included angle of said first surface; and said second surface forming a predetermined included acute angle with said horn face from said cutting edge for reinforcing said anvil cutting edge to resist wear on said anvil cutting edge, the included angle of said second reinforcing surface being greater than the included angle of said first sealing surface so that said first and second surfaces will form a sharpness for said peaked anvil cutting edge which will effect a clean and sharp cutting of the moving material.

2. In an ultrasonic apparatus for edge cutting and sealing moving lengths of at least partially thermoplastic material, particularly textile fabric having at least some thermoplastic fibers, and including anvil means and vibrating sonic horn means having a flat working face cooperating with and vibrating against said anvil means for the ultrasonic edge cutting and sealing as the material moves between said sonic horn means and said anvil means; the improvement of a construction of said anvil means characterized by effecting clean and sharp edge cutting and desired amounts of edge sealing in the material while resisting wear on said anvil means, said anvil means comprising:

an anvil member defining a peaked cutting edge for cutting the moving material as said sonic horn means vibrates against said cutting edge and first and second surfaces extending in respective opposite directions from said peaked cutting edge;

said first surface forming a predetermined included acute angle with said horn face from said cutting edge for fusing the thermoplastic material and sealing the cut edge of the material a predetermined distance inwardly of the cut edge as said sonic horn means vibrates against said anvil means, the predetermined distance of sealing being determined by and increasing with the increasing acuteness of the predetermined included angle of said first surface; and said second surface forming a predetermined included acute angle with said horn face from said cutting edge for reinforcing said anvil cutting edge to resist wear on said anvil cutting edge, the included angle of said second reinforcing surface being greater than the included angle of said first sealing surface so that said first and second surfaces will form a sharpenss for said peaked anvil cutting edge which will effect a clean and sharp cutting of the moving material.

3. In an ultrasonic apparatus, as set forth in claim 1 or 2, in which the included angle of said first sealing surface of said anvil is about 3 to 20 degrees.

4. In an ultrasonic apparatus, as set forth in claim 1 or 2, in which the included angle of said first sealing surface of said anvil is about 5 to 15 degrees.

5. In an ultrasonic apparatus, as set forth in claim 1 or 2, in which the included angle of said second reinforcing surface is at least 2½ degrees larger than the included angle of said first sealing surface and no greater than 45 degrees.

6. In an ultrasonic apparatus, as set forth in claim 1 or 2 in which the included angle of said second reinforcing surface of said anvil is about 30 degrees.

7. In an ultrasonic apparatus, as set forth in claim 1 or 2, in which the included angle of said first sealing surface of said anvil is about 3 to 20 degrees, and the included angle of said second reinforcing surface is at least 2½ degrees larger than the included angle of said first sealing surface and no greater than 45 degrees.

8. Apparatus for ultrasonically edge cutting and sealing textile fabric having thermoplastic fibers and being characterized by a construction which will produce a clean and sharp cut and sealed edge having a desired wash durability without significant raveling; said apparatus comprising:

means for feeding the fabric through said apparatus at a substantially constant predetermined rate of speed., sonic horn means including transducer and booster means and a flat working face on said horn means of hardened metal for vibrating at a predetermined frequency;

anvil means positioned for receiving the moving fabric between said vibrating horn face and said anvil means and for contact by said horn face during its vibrations to edge cut and seal the cut edge of the moving fabric, said anvil means comprising a wheel having a beveled periphery defining therearound a peaked cutting edge and first and second surfaces extending in respective opposite directions from said peaked cutting edge, said first surface extending inwardly of the cut edge being formed on the moving fabric and forming a predetermined included angle with said horn face from said cutting edge for fusing the thermoplastic fibers and sealing the cut edge of the fabric a predetermined distance inwardly of the cut edge which is determined by and increases with the increasing acuteness of the predetermined included angle, said second surface extending outwardly of the cut edge being formed on the moving fabric for reinforcing said anvil cutting edge to resist wear and forming a predetermined included acute angle with said horn face from said cutting edge which is greater than the included angle of said first sealing surface so that said first and second surfaces will form a desired sharpness for said peaked anvil cutting edge which will effect a clean and sharp cutting of the moving fabric; and means mounting said sonic horn means under a predetermined pressure and means mounting said anvil means under a predetermined pressure and for movement away from said horn means a predetermined distance upon contact of said anvil means by said horn means during its vibrations, so that predetermined forces are exerted by said horn means and said anvil means on the moving fabric upon contact between said horn means and said anvil means and said anvil means will float as it is contacted by said horn means for aiding in providing the desired cutting and sealing action on the textile fabric.

9. Apparatus, as set forth in claim 8, in which the predetermined rate of speed of the fabric fed by said feeding means is from about 10 to 100 yards per minute and preferably from about 20 to 40 yards per minute and the predetermined frequency of vibration of said sonic horn means is from about 15,000 to 1,000,000 hertz and preferably from about 20,000 to 40,000 hertz.

10. Apparatus, as set forth in claim 8, in which the predetermined rate of speed of the fabric is about 20 yards per minute and the predetermined frequency of vibration of said sonic horn means is about 20,000 hertz.

11. Apparatus, as set forth in claim 8, in which the predetermined rate of speed of the fabric is about 40 yards per minute and the predetermined frequency of vibration of said sonic horn is about 40,000 hertz.

12. In an ultrasonic apparatus, as set forth in claim 8, in which the included angle of said first sealing surface of said anvil is about 3 to 20 degrees.

13. In an ultrasonic apparatus, as set forth in claim 8, in which the included angle of said first sealing surface of said anvil is about 5 to 15 degrees.

14. In an ultrasonic apparatus, as set forth in claim 8, 12 or 13, in which the included angle of said second reinforcing surface is at least 2½ degrees larger than the included angle of said first sealing surface and no greater than 45 degrees.

15. In an ultrasonic apparatus, as set forth in claim 8, 12 or 13, in which the included angle of said first sealing surface of said anvil is about 30 degrees.

16. Apparatus, as set forth in claim 8, in which the predetermined pressure of said sonic horn mounting means is about 18 to 20 psig and the predetermined pressure of said anvil mounting means is about 20 to 60 psig and preferably about 40 to 50 psig for providing forces of about 11.5 to 34 and preferably about 23 to 29 pounds on the fabric upon contact of anvil means by said horn means.

17. Apparatus, as set forth in claim 8 or 16, in which said anvil mounting means provides for movement of said anvil a distance of from about 1/16 to ⅛ inch away from said horn upon contact of said anvil by said horn.

18. Apparatus for ultrasonically edge cutting and sealing woven textile fabric having at least 65% thermoplastic fibers and being characterized by the construction which will produce a clean and sharp cut and sealed edge having a wash durability of 25 to 50 washings without significant raveling said apparatus comprising:
   means for feeding the fabric through said apparatus at a substantially constant predetermined rate of speed of from about 20 to 40 yards per minute;
   sonic horn means including transducer and booster means and a flat working face on said horn means of hardened metal for vibrating at a predetermined frequency of from about 20,000 to 40,000 hertz;
   anvil means positioned for receiving the moving fabric between said vibrating horn face and said anvil means and for contact by said horn face during its vibrations to edge cut and seal the cut edge of the moving fabric, said anvil means comprising a wheel having a beveled periphery defining therearound a peaked cutting edge and first and second surfaces extending in respective opposite directions from said peaked cutting edge, said first surface extending inwardly of the cut edge being formed on the moving fabric and forming a predetermined included angle of from about 3 to 20 degrees with said horn face from said cutting edge for fusing the thermoplastic fibers and sealing the cut edge of the fabric a predetermined distance of from about 0.01 to 0.10 inches inwardly of the cut edge of the fabric which is determined by and increases with the increasing acuteness of the predetermined included angle, said second surface extending outwardly of the cut edge being formed on the moving fabric for reinforcing said anvil cutting edge to resist wear and forming a predetermined included acute angle at least 2½ degrees larger than the included angle of said first sealing means and no greater than 45 degrees with said horn face from said cutting edge so that said first and second surfaces will form a desired sharpness for said peaked anvil cutting edge which will effect a clean and sharp cutting of the moving fabric; and
   means mounting said sonic horn means under a predetermined pressure of from about 18 to 20 psig and for movement away from said horn a predetermined distance of from about 1/16 to ⅛ inch upon contact of said anvil means by said horn means during its vibrations, so that predetermined forces of about 23 to 29 pounds are exerted by said horn means and said anvil means on the moving fabric upon contact between said horn means and said anvil means and said anvil means will float as it is contacted by said horn means for aiding in providing the desired cutting and sealing action on the textile fabric.

19. Apparatus, as set forth in claim 8 or 18, in which said means mounting said anvil means under a predetermined pressure and for movement away from said horn means a predetermined distance comprises clevis means secured to said anvil means, spring means supporting said clevis means for compressing upon movement of said anvil means away from said horn means upon contact of said anvil means by said horn means, and air-operated piston and cylinder means operatively connected with said spring means for exerting the predetermined pressure on said anvil means.

20. Apparatus, as set forth in claim 19, in which said means mounting said sonic horn means under predetermined pressure comprises air-operated piston and cylinder means.

* * * * *